E. VIZ & J. MUSLAY.
HEAT GENERATOR.
APPLICATION FILED JUNE 6, 1912.
1,092,312.
Patented Apr. 7, 1914.
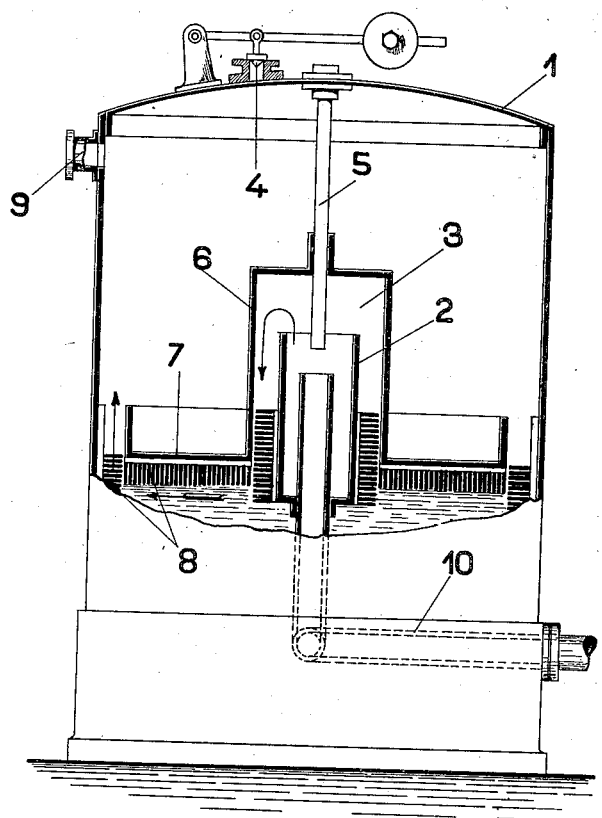

UNITED STATES PATENT OFFICE.

ELEMÉR VIZ, OF KOSD, AND JULIUS MUSLAY, OF BUDAPEST, AUSTRIA-HUNGARY.

HEAT-GENERATOR.

1,092,312.      Specification of Letters Patent.      Patented Apr. 7, 1914.

Application filed June 6, 1912. Serial No. 702,135.

*To all whom it may concern:*

Be it known that we, ELEMÉR VIZ, chaplain, of Kosd, Austria-Hungary, and JULIUS MUSLAY, landowner, of Budapest, Austria-Hungary, have invented certain new and useful Improvements in Heat-Generators, of which the following is a specification.

This invention relates to improvements in heat generators, the novel features of the present improvements residing in the fact that the gases employed for heating the water are brought into direct contact with the surface of the water to be vaporized, whereby much of the piping ordinarily necessary is dispensed with and the heating quality of the gases is utilized to the best advantage.

According to the invention a float is provided within the vaporizing chamber of a heat generator, said float being provided, preferably in the center, with a cap or dome connected to a pipe or pipes for conducting the heating gases into the heat generator. Owing to this arrangement the heating gases reaching said cap pass below the under surface of the float and are thus brought into direct contact with the water to be vaporized before they escape into the upper part of the generator.

In the accompanying drawing an embodiment of the invention is shown, partly in vertical section and partly in outside elevation.

The generator 1, shown as a vertical boiler which may be provided with a safety valve 4, a water gage, a pressure gage, and the other usual fittings, contains an annular float 7 arranged freely on the surface of the water in the boiler. A cylindrical cap or dome 6 is fitted over an annular opening in the float, the cap being guided on the rising and falling of the float by a rod 5.

The upper end of a pipe 10 for the heating gases is connected to the cap 6, said pipe being surrounded by a tubular casing 2, so that the gases which enter the chamber 3 are forced to flow in the direction indicated by the arrows, and, escaping below the float, come into direct contact with the water. The steam thus produced escapes through the pipe 9.

In order to accelerate the vaporization, the lower face of the float is provided with appropriate stiff filaments 8 arranged in closely packed rows; said filaments may be of metal and dip into the water. The spaces between the filaments act as capillary tubes, and become filled with water threads; when these fine threads come into contact with the heating gases they are very quickly vaporized with the utmost economical utilization of heat. Similar filaments may be provided on the wall of the casing 2 or on the inner surface of the generator.

It is evident that the details of the invention may be modified in many ways without departing from the spirit of the invention.

What we claim is:—

1. In a heat generator, a float arranged on the surface of the water to be vaporized, means for guiding said float vertically, an opening in said float, an upwardly directed dome or cap mounted on said float and over said opening, a pipe for the heating gases connected to said dome or cap and a tubular casing surrounding said pipe.

2. In a heat generator, a float arranged on the surface of the water to be vaporized, filaments arranged on the under face of said float, means for guiding said float vertically, an opening in said float, an upwardly directed dome or cap mounted in said float and over said opening, a pipe for the heating gases connected to said dome or cap, and a tubular casing surrounding said pipe.

3. In a heat generator, a float arranged on the surface of the water to be vaporized, filaments arranged on the under face of said float, means for guiding said float vertically, an opening in said float, an upwardly directed dome or cap mounted in said float and over said opening, and filaments arranged between said tubular casing and said dome or cap.

4. In a heat generator, a float arranged on the surface of the water to be heated, filaments arranged on the under face of said float, filaments disposed between the inner wall of the generator casing and said float, means for guiding said float vertically, an opening in said float, an upwardly directed dome or cap mounted in said float and over said opening and filaments arranged between said tubular casing and said dome or cap.

In testimony whereof we have signed our names to this specification in the presence of two subscribing witnesses.

ELEMÉR VIZ.
JULIUS MUSLAY.

Witnesses:
E. St. Kelemen,
John J. Ronto.

Copies of this patent may be obtained for five cents each, by addressing the "Commissioner of Patents, Washington, D. C."